United States Patent
Hou et al.

(10) Patent No.: US 9,227,878 B2
(45) Date of Patent: Jan. 5, 2016

(54) SELECTED BINDERS FOR THE EXTRUSION OF ULTRA-THIN WALL CELLULAR CERAMICS

(75) Inventors: Jun Hou, Painted Post, NY (US); Susan Clair Lauderdale, Painted Post, NY (US); Jonathan David Pesansky, Corning, NY (US)

(73) Assignee: Corning Incorporated, Corning, NY (US)

( * ) Notice: Subject to any disclaimer, the term of this patent is extended or adjusted under 35 U.S.C. 154(b) by 981 days.

(21) Appl. No.: 12/433,365

(22) Filed: Apr. 30, 2009

(65) Prior Publication Data

US 2010/0276851 A1    Nov. 4, 2010

(51) Int. Cl.

| | |
|---|---|
| *C04B 35/478* | (2006.01) |
| *C04B 35/195* | (2006.01) |
| *C04B 38/00* | (2006.01) |
| *C04B 35/636* | (2006.01) |
| *C04B 35/626* | (2006.01) |
| *C04B 111/00* | (2006.01) |

(52) U.S. Cl.
CPC ........... *C04B 38/0006* (2013.01); *C04B 35/195* (2013.01); *C04B 35/478* (2013.01); *C04B 35/6263* (2013.01); *C04B 35/6365* (2013.01); *C04B 2111/00129* (2013.01); *C04B 2235/3206* (2013.01); *C04B 2235/349* (2013.01)

(58) Field of Classification Search
CPC   C04B 38/0006; C04B 35/195; C04B 35/478; C04B 35/6365; C04B 38/0009
USPC .................................................. 264/630, 631
See application file for complete search history.

(56) References Cited

U.S. PATENT DOCUMENTS

| | | | |
|---|---|---|---|
| 3,885,977 | A | 5/1975 | Lachman et al. |
| 4,483,944 | A | 11/1984 | Day et al. |
| 4,855,265 | A | 8/1989 | Day et al. |
| 5,183,608 | A | 2/1993 | Guile |
| 5,258,150 | A | 11/1993 | Merkel et al. |
| 5,290,739 | A | 3/1994 | Hickman |
| 5,660,904 | A | 8/1997 | Anderson et al. |
| 6,113,829 | A * | 9/2000 | Bookbinder et al. .... 264/211.11 |
| 6,210,626 | B1 | 4/2001 | Cornelius et al. |
| 6,319,870 | B1 | 11/2001 | Beall et al. |
| 6,368,992 | B1 | 4/2002 | Beall et al. |
| 6,432,856 | B1 | 8/2002 | Beall et al. |
| 6,620,751 | B1 | 9/2003 | Ogunwumi |
| 6,773,657 | B2 | 8/2004 | Beall et al. |
| 6,849,181 | B2 | 2/2005 | Ogunwumi et al. |
| 6,864,198 | B2 | 3/2005 | Merkel |
| 6,942,713 | B2 | 9/2005 | Ogunwumi et al. |
| RE38,888 | E | 11/2005 | Beall et al. |
| 2004/0020846 | A1 | 2/2004 | Ogunwumi et al. |
| 2004/0029707 | A1 | 2/2004 | Beall et al. |
| 2004/0092381 | A1 | 5/2004 | Beall et al. |
| 2004/0261384 | A1 | 12/2004 | Merkel et al. |
| 2005/0046063 | A1 | 3/2005 | Toda et al. |
| 2008/0254254 | A1 | 10/2008 | Ohno et al. |

FOREIGN PATENT DOCUMENTS

| | | | |
|---|---|---|---|
| EP | 1852406 A2 | 7/2007 | |
| EP | 2105192 A1 | 9/2009 | |
| JP | 2009061751 A | 3/2009 | ................ B28B 3/20 |
| WO | 99/64371 | 12/1999 | |
| WO | 2004/011386 A1 | 2/2004 | |
| WO | 2005/046840 A1 | 5/2005 | |
| WO | 2006/015240 A2 | 2/2006 | |

OTHER PUBLICATIONS

Dow Chemical Company. "Methocel Cellulose Ethers: Technical Handbook", Sep. 2002.*
Dow Chemical Company. "Methocel Cellulose Ethers: Binders and Processing Aids for Ceramics", Mar. 1996.*
DOWWOLFF Answer Center, "METHOCEL Difference Between Regular, Food Grade, and Premium Product," retrieved from http://dowwolff.custhelp.com/app/answers/detail/a_id/1015/~/methocel-difference-between-regul . . . Feb. 16, 2012.
Just, W.K., et. al., "Cellulose Ethers," Encyclopedia of Polymer Science and Engineering, vol. 3, (John Wiley & Sons, NY, NY, 1985), pp. 232-239.

* cited by examiner

*Primary Examiner* — Erin Snelting
(74) *Attorney, Agent, or Firm* — Charles A. Greene

(57) ABSTRACT

The disclosure provides for a mixture suitable for extrusion and firing to form a ceramic honeycomb substrate, said mixture comprising a batch composition selected from the group consisting of a cordierite batch composition and an aluminum titanate batch composition, an optional pore former material; a binder material and water; wherein said binder is a methyl ether of cellulose binder having a count of less than 300 water-insoluble fibers per gram of binder material.

11 Claims, No Drawings

SELECTED BINDERS FOR THE EXTRUSION OF ULTRA-THIN WALL CELLULAR CERAMICS

FIELD

The field of the invention is ultra-thin wall ceramic honeycombs substrates made of cordierite or aluminum titanate, and in particular to selected binders for making such substrates.

BACKGROUND

Ceramic honeycombs, for example cordierite or aluminum titanate honeycombs, are made by extrusion of a ceramic paste. The ceramic paste is prepared by mixing dry raw materials followed by the addition, with further mixing, of liquid components and plasticizing the resulting mixture using an augur or twin screw mixing system. After plasticizing, the ceramic paste is pushed through an extruder die to form a honeycomb "green body" that is further processed. The overall process can be summarized as providing a plasticized ceramic honeycomb precursor batch material comprising inorganic ceramic-forming components, optional pore forming materials (for example a starch or graphite material), liquid components (for example, water), lubricating materials (to aid in extrusion) and binders; plasticizing the mixture; forming a green body having the desired shape, size and cells density from the plasticized ceramic precursor batch material; optionally drying the green body to remove excess moisture and prevent slumping during firing; and firing the dried green body under conditions sufficient to convert the green body into a ceramic honeycomb. Depending on the choice of inorganic materials, the fired honeycomb can be a cordierite or aluminum titanate honeycomb. In the above process one problem that is frequently encountered is the plugging of the die during the extrusion process, particularly when ultra-thin wall honeycomb substrates are formed. The present invention presents a solution to the plugging process.

SUMMARY

In one aspect of the present invention there is provided a method for producing a porous ceramic honeycomb article, comprising the steps of providing inorganic ceramic-forming ingredients; adding a polymeric organic binder material, a solvent and a pore forming agent to the inorganic ceramic-forming ingredients, wherein the organic binder is a polymeric material having less than 300 insoluble polymeric fiber or fiber-like particles per gram (<300 fibers/g) as determined using a 1 wt % aqueous binder solution; mixing the inorganic ceramic-forming ingredients, the binder, the solvent and the pore forming agent to form a precursor batch; forming the precursor batch into a green body; and firing the green body at a temperature sufficient to produce a porous ceramic article. In one embodiment the number of insoluble fibers is less then 200/g. In a further embodiment the number of insoluble fibers is less than 65/g. A preferred binder material for use in the present invention is a water soluble cellulose ether binder (an alkyl cellulose ether) component selected from the group consisting of methyl cellulose, water soluble methyl cellulose derivatives (for example, hydroxypropyl methyl cellulose, hydroxyethyl methyl cellulose), water soluble ethyl cellulose derivatives (for example, hydroxyethyl cellulose) and combinations thereof. In some embodiments the binder material is selected from the group consisting of methyl cellulose, hydroxypropyl methyl cellulose, hydroxyethyl cellulose and hydroxyethyl methyl cellulose.

In one embodiment the invention is directed to a method for preparing a ceramic honeycomb comprising the steps of:
providing a batch composition selected from the group consisting of a cordierite batch composition and an aluminum titanate batch composition;
optionally providing a pore former material;
providing a binder material and water;
mixing the batch composition with the pore former, binder, and water to form a plasticized extrudable paste;
extruding the paste to form a honeycomb green body; and
firing the green body to form a honeycomb comprising a ceramic material selected from the group consisting of cordierite and aluminum titanate;
wherein providing a binder means providing a water soluble alkyl ether of cellulose binder having a count of less than 300 insoluble fibers per gram of binder material as measured for a 1 wt % aqueous solution of binder material.

In one embodiment the invention is directed to a mixture suitable for extrusion and firing to form a ceramic honeycomb substrate, said mixture comprising:
a batch composition selected from the group consisting of a cordierite batch composition and an aluminum titanate batch composition;
optionally, a pore former material;
a binder material; and
water;
wherein said binder is a water soluble alkyl ether of cellulose binder having a count of less than 300 water-insoluble fibers per gram of binder material.

DETAILED DESCRIPTION

Herein the term "ultra-thin wall" means honeycomb substrates that have a wall thickness of less than 4 mil (<0.102 mm); for example, the 600 and 900 cpsi (cells per sq. in.) substrates made by Corning Incorporated that have wall thicknesses of ~3 mil (0.076 mm) and ~2 mil (0.05 mm), respectively. "Thin wall" substrates such as those made by Corning Incorporated have a thickness greater than 4 mil (>0.102 mm) and less than 6 mil. Standard wall substrates (Corning Incorporated) have a thickness in the range of 0.165 mm to 0.280 mm. As also used herein the term "honeycomb" means any ceramic cellular substrate having any number of cells per square inch or centimeter and channels through the substrate from one end to the opposite end. Further, herein the terms "fibers per gram" and "fibers/g" means insoluble fibers per gram of binder as determined by optical microscopy using a 100× microscope and a 1 wt % aqueous binder solution (1 gram of binder and 99 grams water). Alternatively, suspended fiber may be measured with a particle size analyzer such as a Multisizer™ 3 COULTER COUNTER®.

Ceramic honeycomb substrates are typically made by an extrusion process; and descriptions of the materials and the extrusion processes used to prepare ceramic honeycomb substrates can be found in numerous patents and patent applications. Examples of ceramic batch material compositions and processes for forming cordierite honeycombs that can be used in practicing the present invention are disclosed in U.S. Pat. No. 3,885,977; RE 38,888; U.S. Pat. Nos. 6,368,992; 6,319,870; 6,210,626; 5,183,608; 5,258,150; 6,432,856; 6,773,657; 6,864,198; and U.S. Patent Application Publication Nos. 2004/0029707, 2004/0261384, and 2005/0046063. Examples of ceramic batch material compositions and processes for forming aluminum titanate that can be used in practicing the present invention are those disclosed in U.S.

Pat. Nos. 4,483,944; 4,855,265; 5,290,739; 6,620,751; 6,942,713; 6,849,181; U.S. Patent Application Publication Nos.: 2004/0020846; 2004/0092381; and in PCT Application Publication Nos. WO 2006/015240; WO 2005/046840; and WO 2004/011386.

By way of an example without limitation, a cordierite-forming composition is formed using talc, clay, silica, and alumina, a binder material, and addition materials such as water, plasticizers, lubricants, and other materials as is known in the art to make compositions that are then used to form porous cellular ceramic honeycomb structures. The materials are mixed and plasticized, and the resulting composition is pushed through a die to form a honeycomb green body as has been indicated above. However, one problem encountered during formation of the green body is that large particles, fibers and agglomerates that may be present in the batched materials limit the ability to push the composition through dies that have narrow slots; for example dies that are used to make ultra-thin wall honeycombs. Screens having sufficiently small openings to filter-out the particles, fibers and agglomerates, and thus protect the die slots from plugging, significantly raised the pressure required to push the paste through the extrusion system and the dies themselves were quickly plugged. In addition, fibrous materials (for example, cellulose-derived materials and other polymeric materials) were found to orient themselves in the direction of flow and pass through the screens. As a result, while the screens would hold back particles and agglomerates (or cause them to break up on the screen surface due to the applied pressure), the fibrous materials pass through the screens and plug the narrow die slots used for making ultra-thin wall honeycombs.

As is known to the art, the formation of ceramic honeycombs requires that the ceramic precursor composition be formed by some means to the desired shape and then subsequently treated to form and unify the composition into the final form of the article or part. In an extrusion process components of the ceramic material are combined with a "binding agent" and then introduced into a die to impart a particular form upon the combined ceramic and the binding agent. The binding agent, also known to the art as a "binder" imparts a certain degree of dimensional stability and form retention to the mixture, which is a necessary feature of the extrusion process to prevent slumping of the green body before it is fired. After the green body has been formed it is then fired to form the final article. In one embodiment the green body is dried to remove excess moisture prior to firing. The drying, by removing excess moisture, results in a green body that is less likely to slump as it is transported to a firing oven and heated to a temperature sufficient to convert the composition into a ceramic material. During the firing process the binder is driven off leaving a formed honeycomb that is essentially free from any organic materials. Many polymeric materials have been used as a binder and some of these materials are not completely soluble in water. Cellulose-derived materials such as methyl cellulose, water soluble derivatives of methyl cellulose, and water soluble derivatives of ethyl cellulose are preferred binders for use in making ceramic honeycomb substrates because of their ready availability, low cost, ease of use and safety in handling the material. The resulting aqueous "solution" of such polymeric materials may consist of particles that are partially soluble in water or contain both soluble and insoluble fractions. It is the insoluble fractions that create problems during the extrusion of ultra-thin walled honeycomb substrates. Herein methyl cellulose will be used as the binder material exemplifying the invention.

Cellulose is a natural, long chain polymer made by the linking of β-D-glucose molecules by the elimination of water. The length of the chain varies greatly, from a few hundred units in wood pulp to over 6000 for cotton. Cellulose contains many polar —OH groups that form many hydrogen bonds with OH groups on adjacent chains, bundling the chains together. The chains also pack regularly in places to form hard, stable crystalline regions that give the bundled chains even more stability and strength. As a result cellulose is insoluble in water and many organic solvents. However, when cellulose is treated to form alkyl cellulose ethers, many of these alkyl ethers, and/or their derivatives, are water soluble. In particular, alkyl cellulose ethers, for example, methyl cellulose and hydroxypropyl methyl cellulose, and derivatives are water soluble.

Chemically, methyl cellulose is a methyl ether of cellulose, arising from substituting the hydrogen atoms of cellulose's hydroxyl groups (—OH) with methyl groups (—$CH_3$) to form ether groups (—$OCH_3$). This process un-bundles the cellulose chains to an extent and imparts water solubility to the product. However, in the process of making methyl cellulose some portion of the cellulose remains un-reacted or has not been fully reacted and is therefore water insoluble. When the product is dispersed in water insoluble cellulosic fibers resulting from incomplete reaction are present in the resulting solution of methyl cellulose. When these fibers exceed 300 fibers per gram (300 fiber/g) of binder (measured using a 1 wt % aqueous binder solution), screen plugging and die plugging occur much more rapidly than when insoluble fibers are less than 300 fibers/g of binder. As a result, when the insoluble fiber level is greater than 300 fibers/g, problems arise in the making of ultra-thin wall substrates; that is, substrates having a wall thickness of less than 4 mils (<0.101 mm). When very narrow slot dies (less than 0.101 mm) are used for extrusion, even with screens in front of the dies, the dies rapidly become plugged. When insoluble fibers exceed 100 per gram of binder, plugging problems can be expected in dies with 0.05 mm slot widths, whereas binders with less than 100 insoluble fibers per gram of binder have been observed to perform well. Plugging in the die results in non-knits that are breaks in cellular structure that tends to limit the physical strength of the parts. By choosing a binder that has been more fully reacted so that the number of insoluble fibers per gram is less than 300 fiber/g, the plugging is minimized. This eliminates need for frequent changing/cleaning of the screens and dies, maintains good cell integrity (eliminates or minimizes non-knits to an acceptable level), and therefore provides for good physical strength in the finished parts.

A number of methods have been used to differentiate lots/grades of methyl cellulose binder for level of insoluble fibers. One such method involves preparation of a 1% aqueous solution of the binder. A drop is quantitatively transferred to a clean microscope slide. Using an optical microscope having 100× magnification, the number of insoluble fibers on the slide is counted. It is preferred that several slides be prepared and evaluated. From those counts, fibers/g of binder per gram can be calculated. Lots with fiber counts less than 200/gc are suitable for extrusions through 2.85 mils and wider slots. Fiber counts of less than 60/g are suitable for extrusion through dies with slots as narrow as 2.0 mils. The relative number of insoluble fibers has been correlated with extrusion pressure and plug rates of both screens and dies and it has been found that the lower the fibers/g, the lower the extrusion pressure and plug rates of both screens and dies.

Cordierite Example

A cordierite honeycomb substrate, made using a methyl cellulose binder having less than 300 fiber/g as described herein, can be made as described in U.S. Pat. No. 5,296,423 (the '423 patent). Summarizing the '423 patent, a plasticizable admixture is prepared for use in making a substrate having cordierite as its primary phase so that, by weight on an analytical oxide basis, the admixture comprises about 11.5-16.5% MgO, about 33-41% $A_2O_3$ and about 46.6-53.0% $SiO_2$. The sources of the magnesia, alumina and silica are described in the '423 patent, the magnesia source being kaolin generally having an average particle diameter of not greater than about two microns. The kaolin, preferably calcined kaolin, is used in the amount of about 15 to about 39 weight percent, based on total minerals in the batch. The minerals of which the plasticizable admixture is comprised are combined in a mixing step sufficient to produce intimate mixing of the raw material phases to allow complete reaction in thermal processing. Water and extrusion aids, such as binders and lubricants, are added at this stage to help create an extrudable admixture that is formable or moldable. Sufficient extrusion aids well known in the art, such as binders (e.g., methyl celluloses) and lubricants (e.g., stearates), are added to give plastic formability and green strength prior to firing. Binder materials are added to the admixture in an amount of in the range of 2-4 weight percent based on inorganics in the admixture. Sodium stearate was used as the lubricant and was added in an amount in 0.4-1.0 weight percent based on inorganics in the admixture. Water aids in plastic formability and may be controlled to benefit the specific composition. Generally, the batch raw materials utilized in this composition require between about 28 and 35 weight % water based on the dry batch (total organics and inorganics). Variations may be required to accommodate a change in raw materials or particle sizes.

The extrudable admixture prepared as described above can be formed into the desired structure by conventional ceramic forming processes. Herein an extrusion process was used to form a honeycomb substrate green body having ultra-thin walls. Using a methyl cellulose binder having less than 300 insoluble fibers/g the extrusion process went smoothly without plugging of the screens of a dye having <3 mil slots. The green structure was dried, dielectrically, for a period of about 5-20 minutes prior to firing. After drying the green body was fired at a temperature in the range of 1340-1450° C. to form a cordierite honeycomb substrate.

Aluminum Titanate Example

An aluminum titanate honeycomb substrate, made using a methyl cellulose binder having less than 300 fiber/g as described herein, can be made as described in U.S. Pat. No. 7,258,120 (the '120 patent). The process of the '120 patent may be summarized as comprising the steps of first formulating a batch of inorganic raw materials comprising sources of silica, alumina, titania, and an alkaline earth metal (preferably at least one selected from the group consisting of strontium, calcium and barium). A rare earth metal oxide is also added to the batch of raw materials to lower the firing temperature at which the bodies can be processed, lower the CTE, and increase the porosity, all without substantially reducing the strength of the final fired body. In addition, lowering the firing temperature significantly increases furnace furniture life. The batch of raw materials is further mixed together with processing aids selected from the group consisting of plasticizers, lubricants, binders, pore formers, and solvents (such as water). In accordance with the present invention, the preferred binder is methyl cellulose having less then 300 fibrous particles per gram. The batch components and processing aids are mixed together to form a preferably homogeneous and plasticized mixture, which is thereafter shaped into a green body. The shaping step can be performed according to well-known ceramic processing techniques, and is most preferably formed by extrusion of the plasticized mixture through an extrusion die. In one embodiment the plasticized mixture is extruded through a die to form a green body preferably having a honeycomb structure formed of intersecting cell walls. The green body is optionally dried, and then preferably fired to a maximum (top) temperature of less than 1500° C., preferably between 1400-1450° C. to form a predominant phase of aluminum titanate.

Accordingly, in one embodiment the invention is directed to a method for preparing a ceramic honeycomb comprising the steps of providing a batch composition selected from the group consisting of a cordierite batch composition and an aluminum titanate batch composition; providing a pore former material, a binder material and water; mixing the batch composition with the pore former, binder, and water to form a plasticized extrudable paste; extruding the paste to form a honeycomb green body; and firing the green body to form a honeycomb comprising a ceramic material selected from the group consisting of cordierite and aluminum titanate; wherein providing a binder means providing a water soluble alkyl ether of cellulose binder having a count of less than 300 insoluble fibers per gram of binder material as measured for a 1 wt % aqueous solution of binder material. In one embodiment the alkyl cellulose is selected from the group consisting of methyl cellulose, methyl cellulose derivatives, ethyl cellulose, and ethyl cellulose derivatives and combinations thereof. In another embodiment the binder is selected from the group consisting of methyl cellulose and hydroxypropyl methyl cellulose. In a further embodiment the count of insoluble fibers is less than 200 fibers per gram of binder material. In another embodiment the count of insoluble fibers of the alkyl cellulose or alkyl cellulose derivative is less than 65 fibers per gram of binder material.

In another embodiment the invention is directed to a mixture suitable for extrusion and firing to form a ceramic honeycomb substrate, said mixture comprising a batch composition selected from the group consisting of a cordierite batch composition and an aluminum titanate batch composition; a pore former material; a binder material; and water; wherein said binder is a methyl ether of cellulose binder having a count of less than 300 water-insoluble fibers per gram of binder material. In a further embodiment the methyl ether of cellulose has a count of less than 200 water-insoluble fibers per gram of binder material. In an addition embodiment the methyl ether of cellulose has a count of less than 65 water-insoluble fibers per gram of binder material. In another embodiment the methyl ether of cellulose is selected from the group consisting of methyl cellulose, hydroxyethyl methyl cellulose and hydroxypropyl methyl cellulose.

While the invention has been described with respect to a limited number of embodiments, those skilled in the art, having benefit of this disclosure, will appreciate that other embodiments can be devised which do not depart from the scope of the invention as disclosed herein.

We claim:

1. A method for minimizing plugged die slots during extrusion of a honeycomb green body in the preparation of an ultra-thin wall ceramic honeycomb comprising the steps of:
   providing a batch composition selected from the group consisting of a cordierite batch composition and an aluminum titanate batch composition;
   optionally providing a pore former material;
   providing a binder material and water;
   mixing the batch composition with the pore former, binder, and water to form a plasticized extrudable paste;
   extruding the paste through a die to form an ultra-thin wall honeycomb green body; and firing the green body to form an ultra-thin wall honeycomb having a wall thickness of less than 4-mil and a cell density of 600 cells per square inch or greater, the honeycomb comprising a ceramic material selected from the group consisting of cordierite and aluminum titanate;

wherein providing a binder means providing a water soluble alkyl ether of cellulose binder having a count of less than 300 insoluble fibers per gram of binder material as measured for a 1 wt % aqueous solution of binder material.

2. The method according to claim 1, wherein the alkyl ether of cellulose binder is selected from the group consisting of methyl cellulose, and methyl cellulose derivatives and ethyl cellulose derivatives that are water soluble, and combinations thereof.

3. The method according to claim 2, where the count of insoluble fibers is less than 200 fibers per gram of binder material.

4. The method according to claim 2, where the count of insoluble fibers is less than 65 fibers per gram of binder material.

5. The method according to claim 1, wherein the alkyl ether of cellulose binder is a water soluble ether selected from the group consisting of methyl cellulose, hydroxyethyl methyl cellulose, hydroxyethyl cellulose and hydroxypropyl methyl cellulose, and combinations thereof.

6. The method according to claim 5, where the count of insoluble fibers is less than 200 fibers per gram of binder material.

7. The method according to claim 5, where the count of insoluble fibers is less than 65 fibers per gram of binder material.

8. The method according to claim 1, where the count of insoluble fibers is less than 200 fibers per gram of binder material.

9. The method according to claim 1, where the count of insoluble fibers is less than 65 fibers per gram of binder material.

10. The method according to claim 1, further comprising a step of determining the amount of insoluble fibers in the binder.

11. A method for minimizing plugged die slots during extrusion of an ultra-thin wall honeycomb green body in the preparation of an ultra-thin wall ceramic honeycomb comprising the steps of:

providing a batch composition selected from the group consisting of a cordierite batch composition and an aluminum titanate batch composition;

optionally providing a pore former material;

providing a binder material and water;

mixing the batch composition with the pore former, binder, and water to form a plasticized extrudable paste;

extruding the paste through a die to form an ultra-thin wall honeycomb green body; and firing the green body to form an ultra-thin wall honeycomb having a wall thickness of less than 4-mil and a cell density of 600 cells per square inch or greater, the honeycomb comprising a ceramic material selected from the group consisting of cordierite and aluminum titanate;

wherein providing a binder means providing a water soluble alkyl ether of cellulose binder having a count of less than 300 insoluble fibers per gram of binder material as measured for a 1 wt % aqueous solution of binder material, and wherein the paste does not comprise binders having a count of more than 300 insoluble fibers per gram of binder material as measured for a 1 wt % aqueous solution of binder material.

* * * * *